United States Patent
Goto et al.

(10) Patent No.: US 8,663,356 B2
(45) Date of Patent: Mar. 4, 2014

(54) HONEYCOMB STRUCTURE

(75) Inventors: Chika Goto, Nagoya (JP); Masataka Yamashita, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 42 days.

(21) Appl. No.: 12/968,685

(22) Filed: Dec. 15, 2010

(65) Prior Publication Data

US 2011/0203242 A1 Aug. 25, 2011

(30) Foreign Application Priority Data

Jan. 5, 2010 (JP) ................................ 2010-000690

(51) Int. Cl.
- *B01D 39/14* (2006.01)
- *B01D 39/06* (2006.01)
- *B01D 24/00* (2006.01)
- *B01D 50/00* (2006.01)

(52) U.S. Cl.
USPC ................. 55/523; 55/522; 55/524; 422/169; 422/170; 422/171; 422/172; 422/177; 422/178; 422/179; 422/180; 422/181; 422/182

(58) Field of Classification Search
USPC ............. 55/522–524; 422/169–172, 177–182
See application file for complete search history.

(56) References Cited

U.S. PATENT DOCUMENTS

| 6,764,743 | B2* | 7/2004 | Kato et al. | 428/118 |
| 7,572,416 | B2* | 8/2009 | Alward et al. | 422/180 |
| 7,721,438 | B2* | 5/2010 | Ichikawa et al. | 29/890 |
| 7,785,544 | B2* | 8/2010 | Alward et al. | 422/179 |
| 8,137,633 | B2* | 3/2012 | DiFrancesco et al. | 422/168 |
| 2003/0024219 | A1* | 2/2003 | Harada et al. | 55/523 |
| 2003/0108458 | A1* | 6/2003 | Ichikawa et al. | 422/180 |
| 2004/0055265 | A1* | 3/2004 | Ohno et al. | 55/523 |
| 2004/0258582 | A1 | 12/2004 | Miwa et al. | |
| 2005/0069469 | A1 | 3/2005 | Fu et al. | |
| 2006/0193756 | A1* | 8/2006 | Suzuki et al. | 422/177 |
| 2007/0048494 | A1 | 3/2007 | Miyairi et al. | |
| 2007/0269352 | A1* | 11/2007 | Miyairi et al. | 422/168 |
| 2008/0044319 | A1* | 2/2008 | Takahashi et al. | 422/180 |
| 2009/0176053 | A1* | 7/2009 | Miyairi et al. | 428/116 |
| 2009/0274602 | A1* | 11/2009 | Alward et al. | 423/239.1 |

FOREIGN PATENT DOCUMENTS

| EP | 1 484 483 A1 | 12/2004 |
| EP | 2 239 037 A1 | 10/2010 |
| JP | 2003-254034 A1 | 9/2003 |

* cited by examiner

*Primary Examiner* — Amber Orlando
(74) *Attorney, Agent, or Firm* — Burr & Brown, PLLC

(57) ABSTRACT

A honeycomb structure wherein the thickness of each partition wall is 50.8 μm inclusive to 161.5 μm exclusive, the cell density is 15.5 to 62.0 cells/cm$^2$, the cell opening ratio of the honeycomb structure body is 76 to 91%, the porosity of the partition walls is 35 to 45%, the average pore diameter of the partition walls is 2 μm inclusive to 10 μm exclusive, the material for the partition walls includes at least one member selected from the group consisting of cordierite, aluminum titanate, silicon carbide, alumina and mullite, and the value obtained by dividing the average pore diameter of the partition walls by the thickness of the partition walls is larger than 0.04 but smaller than 0.065.

1 Claim, 4 Drawing Sheets

HONEYCOMB STRUCTURE

FIELD OF THE INVENTION

The present invention relates to a honeycomb structure. More particularly, the present invention relates to a honeycomb structure which can capture particulate matter contained in the exhaust gas emitted from a direct injection type gasoline engine, at a high capture efficiency while suppressing rise in pressure loss.

BACKGROUND OF THE INVENTION

A reduction in fuel consumption of automobile is required from the standpoints of protection of global environment and resource saving. In the gasoline engine used mainly in passenger cars, direct injection of fuel is being pushed forward to improve fuel efficiency.

Conventionally, in a gasoline engine, since fuel injection from suction port has been employed, generation of soot [particulate matter (PM)] has been slight and it has caused little problem. However, in the gasoline engine of fuel direct injection type, generation of PM is more than in the fuel injection from suction port and a measure for not releasing the generated PM into the atmosphere has been needed.

Meanwhile, a honeycomb structure is in use as a trapping filter for removing particulate matter discharged from a diesel engine. As a honeycomb structure used as a trapping filter for particulate matter, there is in use a plugged honeycomb structure having plugging portions at given positions of the two end faces (see, for example, Patent Document 1). Here, the plugged honeycomb structure refers to a honeycomb structure comprising a honeycomb structure body having porous partition walls forming a plurality of divided cells each to function as a passage for fluid (exhaust gas, purified gas) and an outer wall present at the outermost circumference of the honeycomb structure body, and plugging portions provided at "the open ends of given cells at the fluid (exhaust gas) inlet side end face of the honeycomb structure body" as well as at "the open ends of residual cells at the fluid (purified gas) outlet side end face of the honeycomb structure body". In such a honeycomb structure, an exhaust gas flows into cells from the exhaust gas inlet side end face; the exhaust gas which has flown into the cells passes through partition walls; the exhaust gas (purified gas) which has passed through the partition walls is discharged from the exhaust gas outlet side end face. During the passage of exhaust gas through partition walls, the PM contained in the exhaust gas is captured by partition walls and the exhaust gas turns into a purified gas.

It is considered to use the above-mentioned, plugged honeycomb structure used for removal of the particulate matter discharged from diesel engines, for removal of the particulate matter discharged from gasoline engines.

PRIOR ART DOCUMENT

Patent Document

Patent Document 1: JP-A-2003-254034

SUMMARY OF THE INVENTION

However, conventionally, a three way catalyst converter, an NOx adsorption and reduction catalyst, etc. have been used in order to treat the exhaust gas emitted from a gasoline engine. If a plugged honeycomb structure is mounted additionally in the exhaust system of gasoline engine, there are anticipated problems such as reduction in engine output due to increased pressure loss in exhaust system.

Further, in order to solve the above-mentioned problem of increased pressure loss, it is considered to use in the exhaust system of gasoline engine, as "the plugged honeycomb structure for PM capture", a plugged honeycomb structure having thin partition walls thickness. However, when such a plugged honeycomb structure having thin partition walls thickness is used in the gasoline engine, the amount of PM generated is smaller than in the diesel engine; a PM layer is hardly formed on the surface of partition walls of the plugged honeycomb structure; the partition walls per se capture the PM; accordingly, the efficiency of PM capture has been insufficient.

Further, in the plugged honeycomb structure having thin partition walls thickness, it is considered that the porous partition walls have a small thickness; therefore, pores of large pore diameters become through-holes having a column-like shape in some cases and the PM may leak out from the through-holes. Incidentally, when the PM discharged from diesel engines is captured by a plugged honeycomb structure, the amount of the PM generated is large and accordingly a deposition layer of PM is formed on the surface of partition walls; this PM deposition layer on the surface of partition walls functions so as to capture the PM contained in exhaust gas; resultantly, a sufficient efficiency of PM capture can be obtained.

Further, in order to increase the efficiency of PM capture, it is also considered to make smaller the pore diameters of the porous partition walls of plugged honeycomb structure. However, the smaller pore diameters of partition walls have invited problems such as excessively increased resistance during the passage of exhaust gas through partition walls and increased pressure loss.

Since gasoline engines and diesel engines differ in the fuel used, they differ not only in the amount of PM in exhaust gas but also in the particle diameter, shape and constituents of PM in exhaust gas. Accordingly, the optimum constitution (feature) of the honeycomb structure used for capture of the PM in exhaust gas differs between gasoline engines and diesel engines.

SUMMARY OF THE INVENTION

The present invention has been made in light of the above-mentioned problems of prior art and aims at providing a honeycomb structure which can capture a particulate matter contained in the exhaust gas emitted from a direct injection type gasoline engine, at a high capture efficiency while suppressing rise in pressure loss.

The present invention provides the following honeycomb structure.

A honeycomb structure is provided comprising a honeycomb structure body having porous partition walls forming a plurality of divided cells that each function as a passage for fluid and an outer wall present at the outermost circumference of the honeycomb structure body, and plugging portions provided at the open ends of given cells at the fluid inlet side end face of the honeycomb structure body as well as at the open ends of residual cells at the fluid outlet side end face of the honeycomb structure body, wherein the thickness of each partition wall is 50.8 µm inclusive to 161.5 µm exclusive, the cell density is 15.5 to 62.0 cells/cm$^2$, the cell opening ratio of the honeycomb structure body is 76 to 91%, the porosity of the partition walls is 35 to 45%, the average pore diameter of the partition walls is 2 µm inclusive to 10 µm exclusive, the material for the partition walls includes at least one member selected from the group consisting of cordierite, aluminum titanate, silicon carbide, alumina and mullite, and the value obtained by dividing the average pore diameter of the partition walls by the thickness of the partition walls is larger than 0.040 but smaller than 0.065.

In the present honeycomb structure, the thickness of each partition wall is 50.8 μm inclusive to 161.5 μm exclusive; the cell density is 15.5 to 62.0 cells/cm$^2$; the cell opening ratio of the honeycomb structure body is 76 to 91%; the porosity of the partition walls is 35 to 45%; the average pore diameter of the partition walls is 2 μm inclusive to 10 μm exclusive; the material for the partition walls includes at least one member selected from the group consisting of cordierite, aluminum titanate, silicon carbide, alumina and mullite; and the value obtained by dividing the average pore diameter of the partition walls by the thickness of the partition walls is larger than 0.040 but smaller than 0.065. Therefore, the present honeycomb structure can capture a particulate matter contained in the exhaust gas emitted from a fuel direct injection type gasoline engine, at a high capture efficiency while suppressing rise in pressure loss.

DETAILED DESCRIPTION OF THE INVENTION

A mode for carrying out the present invention is described specifically below. However, the present invention is in no way restricted to the following embodiment. It should be construed that design changes, improvements, etc. can be appropriately added to the following embodiment based on the ordinary knowledge possessed by those skilled in the art as long as there is no deviation from the gist of the present invention.

(1) Honeycomb Structure

Figure 1:
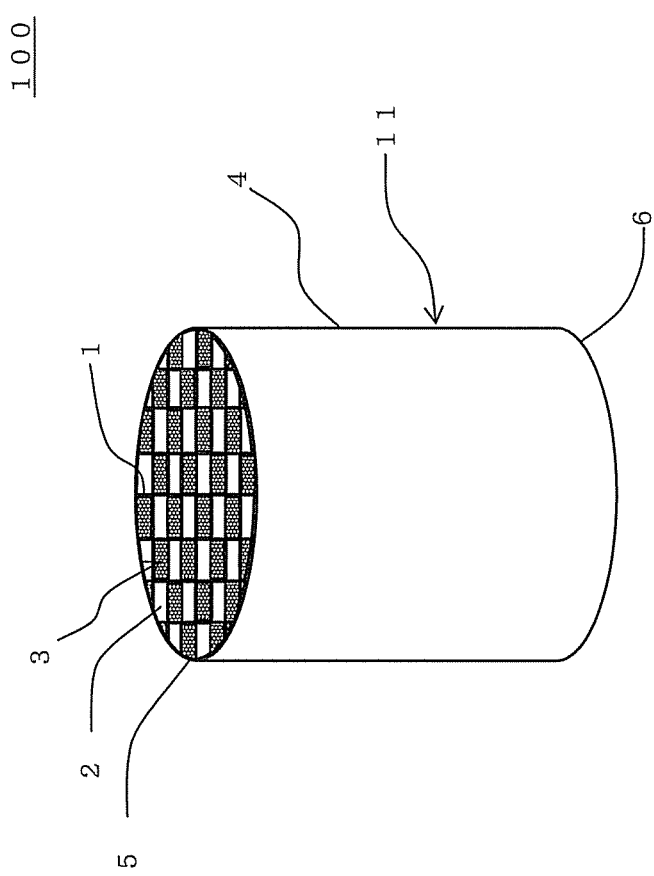
FIG. 1 is a perspective view schematically showing an embodiment of the honeycomb structure of the present invention.
Figure 2:
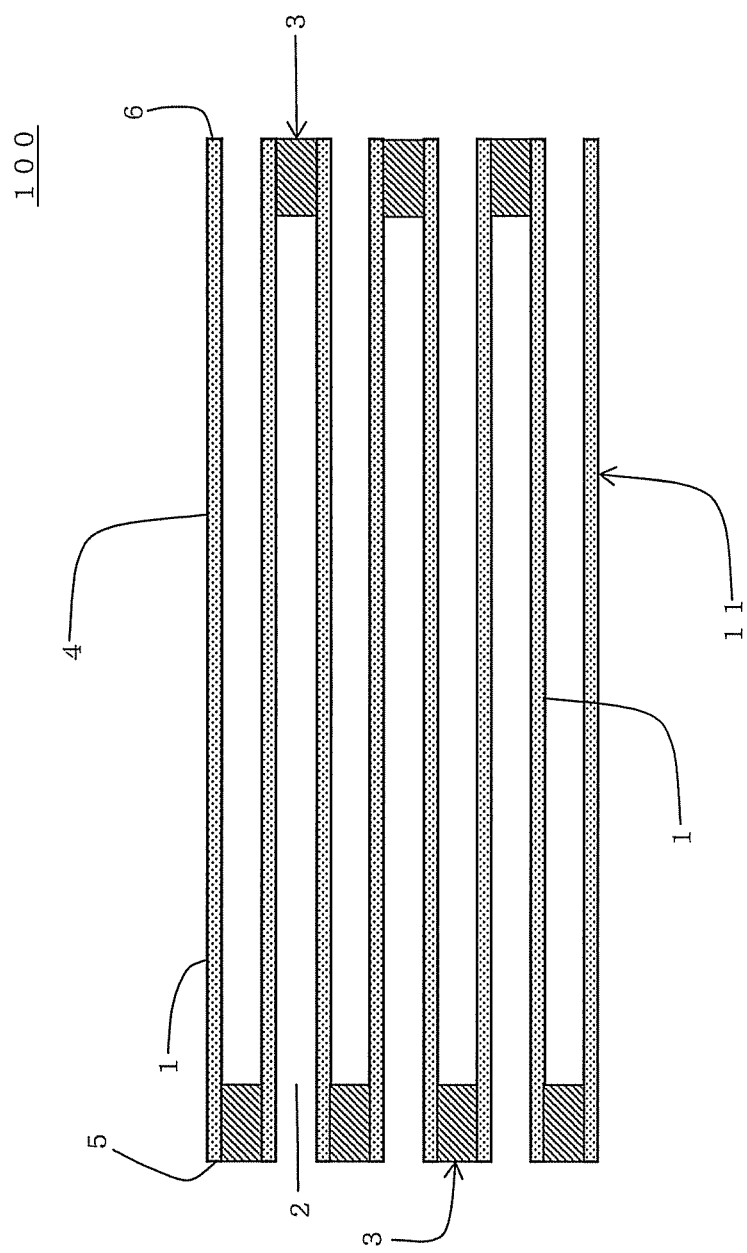
FIG. 2 is a schematic view showing a section of an embodiment of the honeycomb structure of the present invention, parallel to the direction to which the cells of the honeycomb structure extend.

As shown in FIG. 1 and FIG. 2, an embodiment of the honeycomb structure of the present invention comprises a honeycomb structure body 11 having porous partition walls 1 forming a plurality of divided cells 2 each to function as a passage for fluid and an outer wall 4 present at the outermost circumference of the honeycomb structure body 11, and plugging portions 3 provided at "the open ends of given cells 2 at the fluid inlet side end face 5 of the honeycomb structure body 11 and the open ends of residual cells 2 at the fluid outlet side end face 6 of the honeycomb structure body 11", wherein the thickness of each partition wall 1 is 50.8 μm inclusive to 161.5 μm exclusive, the cell density is 15.5 to 62.0 cells/cm$^2$, the cell opening ratio of the honeycomb structure body 11 is 76 to 91%, the porosity of the partition walls 1 is 35 to 45%, the average pore diameter of the partition walls 1 is 2 μm inclusive to 10 μm exclusive, the material for the partition walls 1 includes at least one member selected from the group consisting of cordierite, aluminum titanate, silicon carbide, alumina and mullite, and the value obtained by dividing the average pore diameter of the partition walls 1 by the thickness of the partition walls 1 is larger than 0.040 but smaller than 0.065.

FIG. 1 is a perspective view schematically showing an embodiment of the honeycomb structure of the present invention. FIG. 2 is a schematic view showing a section of an embodiment of the honeycomb structure of the present invention, parallel to the direction to which the cells of the honeycomb structure extend.

Since the "partition wall thickness", "cell density", "cell opening ratio", "porosity of partition walls", "average pore diameter of partition walls", "material for partition walls" and "relationship between average pore diameter of partition walls and thickness of partition walls" were specified at respective given values, as shown above, the honeycomb structure of the present embodiment can capture particulate matter contained in the exhaust gas emitted from a direct injection type gasoline engine, at a high capture efficiency while suppressing rise in pressure loss.

In the honeycomb structure 100 of the present embodiment, the thickness of partition walls 1 (partition wall thickness) is 50.8 μm inclusive to 161.5 μm exclusive, preferably 63.5 to 160.0 μm, more preferably 63.5 to 132.1 μm. When the partition wall thickness is smaller than 50.8 μm, the PM passes easily through the partition walls (the capture efficiency drops) and the honeycomb structure 100 has a low strength. When the partition wall thickness is 161.5 μm or larger, the pressure loss when the exhaust gas passes through the plugged honeycomb structure, is large. "Partition wall thickness" is a value determined using a scanning electron microscope (SEM).

In the honeycomb structure 100 of the present embodiment, the porosity of partition walls 1 is 35 to 45%, preferably 38 to 42%. A porosity of smaller than 35% is not preferred because it invites an increased pressure loss. A porosity of larger than 45% is not preferred because the PM passes easily through the partition walls and the honeycomb structure 100 is fragile, causing easy detachment. The porosity of partition walls 1 is a value determined using a mercury porosimeter.

In the honeycomb structure 100 of the present embodiment, the average pore diameter of partition walls 1 is 2 μm inclusive to 10 μm exclusive, preferably 4 to 8 μm. An average pore diameter of smaller than 2 μm is not preferred because it invites an increased pressure loss. An average pore diameter of 10 μm or larger is not preferred because the PM passes easily through the partition walls (the capture efficiency drops) and the honeycomb structure 100 is fragile, causing easy detachment. The average pore diameter of partition walls 1 is a value determined using a mercury porosimeter.

In the honeycomb structure 100 of the present embodiment, the value obtained by dividing the average pore diameter of partition walls 1 by the thickness of partition walls 1 is larger than 0.040 but smaller than 0.065, preferably 0.049 to 0.056. A value of 0.040 or smaller is not preferred because it invites an increased pressure loss. A value of 0.065 or larger is not preferred because the PM passes easily through the partition walls (the capture efficiency drops) and the honeycomb structure 100 is fragile, causing easy detachment.

In the honeycomb structure 100 of the present embodiment, the material for partition walls 1 includes at least one member selected from the group consisting of cordierite, aluminum titanate, silicon carbide, alumina and mullite. The material for partition walls 1 contains, as "the main constituent", preferably at least one member selected from the group consisting of cordierite, aluminum titanate, silicon carbide, alumina and mullite, more preferably "one member" selected from the group consisting of cordierite, aluminum titanate, silicon carbide, alumina and mullite. Here, "the main constituent" refers to a constituent contained in an amount of at least 70 mass % relative to the total amount of material for partition walls. Further, cordierite and aluminum titanate having small thermal expansion coefficient are preferred for higher thermal shock resistance. The thermal expansion coefficient is preferably $1.0 \times 10^{-6}$ or less, more preferably $0.8 \times 10^{-6}$ or less. Being constituted by such a material, the plugged honeycomb structure is assured in heat resistance and can maintain its function even when exposed to a high-temperature exhaust gas.

When there is used a material (e.g. silicon carbide or silicon nitride) whose thermal expansion coefficient exceeds $1.0 \times 10^{-6}$, it is preferred to produce a bonded type honeycomb structure by producing a plurality of narrow and long (in a cell-extending direction) honeycomb structures (honeycomb segments) of, for example, quadrangular prism-like shape and bonding the honeycomb segments so that their sides contact with each other.

In the honeycomb structure 100 of the present embodiment, the cell density (the number of cells 2 per unit area, in a honeycomb structure section perpendicular to the cell-extending direction of honeycomb structure) is 15.5 cells/cm$^2$ to 62.0 cells/cm$^2$, preferably 31.0 cells/cm$^2$ to 46.5 cells/cm$^2$. A cell density of smaller than 15.5 cells/cm$^2$ (the partition wall thickness is set constant) is not preferred because it invites a larger filtration rate and resultantly a lower efficiency of PM capture. A cell density of larger than 62.0 cells/cm$^2$ (the partition wall thickness is set constant) is not preferred because it invites an increased pressure loss.

In the honeycomb structure 100 of the present embodiment, the cell opening ratio of the honeycomb structure body 11 is 76 to 91%, preferably 83 to 91%. A cell opening ratio of smaller than 76% is not preferred because it invites an increased pressure loss. A cell opening ratio of larger than 91% is not preferred because it invites a larger filtration rate and resultantly a lower efficiency of PM capture and further invites an insufficient partition wall strength. Here, "the cell opening ratio of honeycomb structure body 11" means a ratio of "sectional area total of all cells" to total of "sectional area of all partition walls" and "sectional area total of all cells", in a section of the honeycomb structure body perpendicular to its cell-extending direction.

In the honeycomb structure 100 of the present embodiment, the hydraulic diameter of cell need not be the same in all cells. The hydraulic diameter may differ between the cells each having an open end at the inlet and the cells each having an open end at the outlet. When the honeycomb structure is used for the purification of exhaust gas from gasoline engine, it is preferred that the hydraulic diameter of cells each having an open end at the outlet side end face is larger than the hydraulic diameter of cells each having an open end at the inlet side end face, in order to achieve a small pressure loss. It is further preferred that the hydraulic diameter of cells each having an open end at the inlet side end face is 20 to 45% of the hydraulic diameter of cells each having an open end at the outlet side end face. "The hydraulic diameter of cell" is a value calculated from an expression of [4×(sectional area)/(circumferential length)]. Here, "sectional area" refers to the area of cell in section perpendicular to cell-extending direction, and "circumferential length" refers to "the length of circumference of cell" in section perpendicular to cell-extending direction.

In the honeycomb structure 100 of the present embodiment, there is no particular restriction as to the shape of cell. However, the cell shape in a section perpendicular to the cell-extending direction is preferably a polygon (e.g. triangle, tetragon, pentagon or hexagon), a circle, or an oval. The cell shape may be an indeterminate shape. It may be a combination thereof. Further, in the honeycomb structure 100, it is preferred that the cell sectional area in a section perpendicular to the cell-extending direction is the same in all cells. However, it is also preferred that each sectional area (the sectional area in a section perpendicular to the cell-extending direction) of given cells 2 each having a plugging portion 3 at the inlet side end face 5 is smaller than each sectional area (the sectional area in a section perpendicular to the cell-extending direction) of residual cells 2 each having a plugging portion 3 at the outlet side end face 6. Thereby, in the cells 2 (the above mentioned residual cells) into which an exhaust gas flows, the surface area of partition walls for capture of particulate matter is larger, which can suppress an increase in pressure loss in capture of the particulate matter contained in an exhaust gas.

In the honeycomb structure 100 of the present embodiment, there is no particular restriction as to the external shape. However, there can be mentioned, as the external shape, a cylinder, an elliptic cylinder, "a prism having a polygonal (e.g. tetragonal) bottom", a column having an indeterminate bottom, etc. There is no particular restriction, either, as to the size of the honeycomb structure 100. However, when the external shape is a cylinder, the bottom diameter is preferably 80 to 180 mm. The length in the central axis direction of honeycomb structure is preferably 30 to 200 mm. Also, the ratio (length/outer diameter) of the length in the central axis direction of honeycomb structure to the outer diameter (diameter) of honeycomb structure is preferably 0.3 to 2.0. Further, when the shape of the honeycomb structure 100 is other shape, the area of the bottom is preferably in the same range as the area of the bottom of the honeycomb structure of cylindrical shape.

In the honeycomb structure 100 of the present embodiment, the outer wall present at the outermost circumference may be a wall formed integrally with a honeycomb formed body, i.e. an integrally formed wall, or a coated cement wall formed by grinding the circumference of the honeycomb formed body obtained, into an desired shape and then forming thereon an outer wall with a cement or the like. In the case of the integrally formed wall, the material for the outer wall is preferably the same as the material for the honeycomb structure body. When the outer wall is a coated cement wall, there can be mentioned, as the material for the coated cement wall, for example, a material obtained by adding, to common material, a flux component (e.g. glass). In addition, the thickness of the outer wall is preferably 0.5 to 1.5 mm.

In the honeycomb structure 100 of the present embodiment, the depth of plugging portion 3 is preferably 1 to 5 mm, more preferably 1 to 3 mm. When the depth is smaller than 1 mm, the plugging portion 3 may have a low strength. When the depth is larger than 5 mm, each partition wall 1 may have a small area for PM capture. Here, the depth of plugging portion means a length of plugging portion in "cell-extending direction".

The honeycomb structure 100 of the present embodiment has plugging portions 3 at "the open ends of given cells 2 at the fluid inlet side end face 5 of the honeycomb structure body 11 and the open ends of residual cells 2 at the fluid outlet side end face 6 of the honeycomb structure body 11". The given cells and the residual cells are arranged alternately (i.e. positioned alternately) and it is preferred that, at the inlet side end face 5 and the outlet side end face 6, a checkerwise pattern is formed by the plugging portions and "the cell open ends".

In the honeycomb structure of the present embodiment, it is preferred that the material for plugging portions 3 include at least one member selected from the group consisting of cordierite, mullite, alumina, silicon carbide, and aluminum titanate. Further preferably, the material for plugging portions 3 is the same as the material for partition walls 1.

In the honeycomb structure 100 of the present embodiment, there may be loaded, on the surface of partition walls 1, a catalyst for burning and removing particulate matter, a catalyst for removing the harmful substances (e.g. NOx) contained in an exhaust gas, etc., so as to satisfy the application purpose of the honeycomb structure.

(2) Process for Production of Honeycomb Structure

Next, description is made on the process for producing an embodiment of the honeycomb structure of the present invention.

In the process for production of the honeycomb structure of the present embodiment, it is preferred to prepare, at first, a raw material for ceramic formation, containing ceramic raw materials.

The ceramic raw materials contained in the raw material for ceramic formation, preferably include at least one member selected from the group consisting of a raw material for cordierite formation, cordierite, mullite, alumina, silicon carbide and aluminum titanate. The ceramic raw materials are more preferably at least one member selected from the group consisting of a raw material for cordierite formation, cordierite, mullite, alumina, silicon carbide and aluminum titanate, and are particularly preferably a member selected from the group consisting of a raw material for cordierite formation, cordierite, mullite, alumina, silicon carbide and aluminum titanate. Incidentally, the raw material for cordierite formation is a ceramic raw material in which constituents are compounded so as to give a chemical composition of 42 to 56 mass % of silica, 30 to 45 mass of alumina and 12 to 16 mass % of magnesia, and becomes cordierite upon firing.

As the specific raw material for cordierite formation, there are preferably used a silica source component, a magnesia source component and an alumina source component.

As the silica source component, there can be mentioned quartz, fused silica, etc. The particle diameter of the silica source component is preferably 100 to 150 µm.

As the magnesia (MgO) source component, there can be mentioned talc, magnesite, etc. Of them, talc is preferred. Talc is contained in the raw material for cordierite formation, preferably in an amount of 37 to 43 mass %. The average particle diameter of talc is preferably 5 to 50 µm, more preferably 10 to 40 µm. The magnesia source component may contain impurities such as $Fe_2O_3$, CaO, $Na_2O$, $K_2O$ and the like.

The alumina source component is preferably at least one member selected from the group consisting of aluminum oxide and aluminum hydroxide, because their impurity contents are low. When aluminum hydroxide is used, the content of aluminum hydroxide in the raw material for cordierite formation is preferably 10 to 30 mass %. When aluminum oxide is used, the content of aluminum oxide in the raw material for cordierite formation is preferably 1 to 45 mass %. When aluminum hydroxide and aluminum oxide are used in combination, their contents in the raw material for cordierite formation are preferably 5 to 25 mass % of aluminum hydroxide and 10 to 40 mass % of aluminum oxide.

The raw material for ceramic formation is preferably prepared by mixing the above-mentioned ceramic raw materials with a dispersing medium, a pore former, a binder, a dispersing agent, a surfactant, etc. The mixing ratio thereof is preferably 10 to 40 mass parts of dispersing medium, 3 to 40 mass parts of pore former, 3 to 8 mass parts of binder, 0.1 to 2 mass parts of dispersing agent and 0.1 to 2 mass parts of surfactant with respect to 100 mass parts of ceramic raw materials.

Water can be mentioned as a dispersing medium.

As to a pore former, there is no particular restriction as long as it can generate pores after firing, and there can be mentioned, for example, starch, foamed resin, water-absorptive resin, silica gel and carbon.

As a binder, there can be mentioned hydroxypropyl methyl cellulose, methyl cellulose, hydroxyethyl cellulose, carboxymethyl cellulose, polyvinyl alcohol, etc.

As a dispersing agent, there can be mentioned dextrin, polyalcohol, etc.

As a surfactant, there can be mentioned, for example, fatty acid soap.

Next, it is preferred to knead the prepared raw material for ceramic formation, using a kneader, a vacuum pugmill or the like, to form a puddle.

Then, it is preferred to mold the puddle to form a columnar honeycomb formed body having partition walls forming a plurality of divided cells each to function as a fluid passage and an outer wall present at the outermost circumference. As the method for forming the puddle, there can be mentioned extrusion, injection molding, press molding, etc. Of these, extrusion is preferred because it allows for continuous forming and orientation of, for example, cordierite crystal. Extrusion can be carried out by using an apparatus such as vacuum pugmill, ram extruder, double-screw continuous extruder or the like. A honeycomb formed body can be formed preferably, for example, by conducting extrusion using a die having a desired cell shape, a desired partition wall thickness and a desired cell density. The material for die is preferably a sintered hard alloy which is highly resistant to wear.

After the forming the above, the honeycomb formed body obtained may be dried. As to the method for drying, there is no particular restriction; however, there can be mentioned, for example, hot-air drying, microwave drying, dielectric drying, reduced pressure drying, vacuum drying and freeze-drying. Of these, dielectric drying, microwave drying or hot-air drying, or a combination thereof is preferred. The drying conditions are preferably 80 to 150° C. for drying temperature and 5 minutes to 2 hours for drying time.

Then, it is preferred to fire the honeycomb formed body obtained, to obtain a honeycomb fired body (corresponding to the honeycomb structure body 11). Incidentally, the firing may be conducted after formation of plugging portions in the honeycomb formed body.

Prior to the firing (main firing) of the honeycomb formed body, it is preferred to calcinate the honeycomb formed body. The calcination is conducted for degreasing. As to the method for calcination, there is no particular restriction, and any calcination method may be used as long as it can remove the organic substances (e.g. organic binder, dispersing agent and pore former) contained in the honeycomb formed body. In general, the combustion temperature of organic binder is about 100 to 300° C. and the combustion temperature of pore former is about 200 to 800° C.; therefore, the calcination conditions are preferably about 200 to 1,000° C. and about 3 to 100 hours in an oxidizing atmosphere.

The firing (main firing) of the honeycomb formed body is conducted in order to sinter the raw material constituting the calcinated honeycomb formed body to become a higher density and secure a desired strength. The firing conditions (temperature, time and atmosphere) differ depending upon the kind of the raw material and, therefore, are selected appropriately depending upon the kind of the material. For example, when a raw material for cordierite formation is used, the firing temperature is preferably 1,410 to 1,440° C. and the firing time is preferably 3 to 15 hours.

Then, it is preferred to fill a plugging material in the open ends of given cells (first cells) at the fluid inlet side end face of the honeycomb fired body obtained as well as in the open ends of residual cells (second cells) at the fluid outlet side end face of the honeycomb fired body obtained, to obtain an embodiment of the honeycomb structure of the present invention having plugging portions at the open ends of given cells (first cells) at the fluid inlet side end face of the honeycomb structure as well as at the open ends of residual cells (second cells) at the fluid outlet side end face of the honeycomb structure.

As the method for filling a plugging material in the honeycomb fired body, there can be mentioned a method comprising a masking step of attaching a sheet on one end face of a honeycomb fired body having porous partition walls forming a plurality of divided cells each to function as a fluid passage and an outer wall present at the outermost circumference of the honeycomb structure body, and forming pores in the sheet at its positions corresponding to the given cells of honeycomb fired body in which plugging portions are to be formed, and a forcing step of forcing the sheet-attached end of the honeycomb fired body into a vessel containing a plugging material, and forcing the plugging material into the given cells from the one end face of the honeycomb fired body through the pores formed in the sheet. After plugging portions have been formed in the given cells at the one end of the honeycomb fired body, plugging portions are formed in residual cells at the other end face of the honeycomb fired body, in the same manner, whereby a honeycomb structure of the present invention is obtained preferably.

The material for the sheet to be attached on the end face of the honeycomb fired body is preferably a polyester resin, more preferably PET (polyethylene terephthalate). The thickness of the sheet is preferably 30 to 70 μm.

In forming pores in the sheet, it is preferred to pick up the image of the end face of honeycomb fired body using an imaging device to beforehand prepare an image data capable of identifying the shapes and positions of the cells in which plugging portions are to be formed and the cells in which no plugging portions are to be formed. It is further preferred to form pores, based on the above-prepared image data, at "the positions of the sheet corresponding to the cells in which plugging portions are to be formed", using a laser. There, is no particular restriction as to the imaging device; however, there can be mentioned, for example, CCD (charge-coupled device) cameras and CMOS (complementary metal oxide semiconductor) sensors.

The plugging material is preferably the same material as used for the partition walls. However, the amount of dispersing medium therein is preferably selected so that the viscosity of the plugging material at 25° C. becomes 100 to 300 dPa·s.

EXAMPLES

The present invention is described more specifically below by way of Examples. However, the present invention is in no way restricted to these Examples.

Example 1

Talc, kaolin, alumina, aluminum hydroxide and silica were mixed to prepare a raw material for cordierite formation. To 100 mass parts of the raw material for cordierite formation were added 13 mass parts of a pore former, 35 mass parts of a dispersing medium, 6 mass parts of an organic binder and 0.5 mass part of a dispersing agent, followed by mixing and kneading, to prepare a puddle. As the pore former, there was used coke having an average particle diameter of 1 to 10 μm; water was used as the dispersing medium; hydroxypropyl methyl cellulose was used as the organic binder; and ethylene glycol was used as the dispersing agent.

Then, the puddle was extruded using a given die to obtain a honeycomb formed body having a tetragonal cell shape and a cylindrical overall shape. The honeycomb formed body was dried using a microwave dryer and further dried completely using a hot-air dryer. The resulting honeycomb formed body was cut at the two ends for adjustment into a given size.

Then, masks were applied to given open cell ends of one end face of the honeycomb formed body, alternately so that the one end face showed a checkerwise pattern. The end of the honeycomb formed body at which the masks were applied, was dipped in a plugging slurry containing a raw material for cordierite formation, to form plugging portions arranged alternately in a checkerwise pattern. As to the other end of the honeycomb formed body, masks were applied to the cells which had been plugged at the one end; and plugging portions arranged alternately in a checkerwise pattern were formed in the same manner as used in the formation of plugging portions at the one end of the honeycomb formed body.

Then, the honeycomb formed body in which plugging portions had been formed, was dried using a hot-air dryer and then fired at 1,410 to 1,440° C. for 5 hours, to obtain a honeycomb structure.

The honeycomb structure had a diameter of 105.7 mm at the bottom, a length of 115.4 mm in the central axis direction, a partition wall thickness (rib thickness) of 152.4 μm, a cell density of 15.5 cells/cm$^2$, a "cell opening ratio at the inlet side end face of honeycomb structure body" (OFA: open frontal area) of 88.3%, a porosity of partition wall (porosity), of 39%, an average pore diameter of partition wall of 8 μm, and a "value obtained by dividing the average pore diameter (d) of partition wall by the partition wall thickness (t)" (d/t), of 0.052.

The porosity of partition wall and the average pore diameter of partition wall were measured using a mercury porosimeter. The "thickness of partition wall" was measured using a scanning electron microscope (SEM).

The honeycomb structure obtained was evaluated for "efficiency of PM capture", "pressure loss" and "strength of honeycomb structure", according to the following methods. The results are shown in Table 1.

(Efficiency of PM Capture)

A honeycomb structure was fitted to the exhaust system of a direct injection type gasoline engine having a 2-liter displacement. The direct injection type gasoline engine was operated under the conditions of 2,000 rpm and 50% torque. There were measured, by SMPS, the counts (numbers) of PM in the exhaust gas (untreated exhaust gas) right before flowing into the honeycomb structure and in the exhaust gas (treated exhaust gas) leaving the honeycomb structure. A ratio of "PM count in treated exhaust gas" to "PM count in untreated exhaust gas" was calculated and taken as efficiency of PM capture. An efficiency of PM capture, of 60% or higher was taken as pass and indicated in "○" in Tables. SMPS means a scanning mobility particle sizer, and there was used Model 3936 N 86 (a product of TSI). Incidentally, in Tables 1 and 2, "X" indicates fail in the test of efficiency of PM capture.

(Pressure Loss)

A honeycomb structure was fitted to the exhaust system of a direct injection type gasoline engine having a 2-liter displacement, and pressure loss under total-load operation was measured. A pressure loss of 10 kPa or smaller was taken as pass and indicated in "○" in Tables.

(Strength of Honeycomb Structure)

A hydrostatic pressure was applied to the whole portion of a honeycomb structure; a pressure which caused breakage, was measured; it was taken as the strength of the honeycomb structure. A strength of 0.5 MPa or larger was taken as pass and indicated in "○" in Tables.

(Overall Rating)

A case in which all of "pressure loss", "efficiency of PM capture" and "strength" were "○", was taken as pass and indicated in "○" in Tables. Other cases were taken as fail and indicated in "X" in Tables.

TABLE 1

| | Cell Density (cells/cm²) | Rib thickness (μm) | OFA (%) | Porosity (%) | Average pore diameter (μm) | d/t | Efficiency of PM capture (%) | | Pressure loss (kPa) | | Strength (MPa) | | Overall rating |
|---|---|---|---|---|---|---|---|---|---|---|---|---|---|
| Comparative Example 1 | 7.8 | 152.4 | 92 | 39 | 8 | 0.052 | 62 | ○ | 9 | ○ | 0.2 | x | x |
| Comparative Example 2 | 7.8 | 177.8 | 90 | 39 | 8 | 0.045 | 70 | ○ | 11 | x | 0.3 | x | x |
| Example 1 | 15.5 | 152.4 | 88 | 39 | 8 | 0.052 | 65 | ○ | 5.5 | ○ | 0.55 | ○ | ○ |
| Comparative Example 3 | 15.5 | 177.8 | 87 | 39 | 8 | 0.045 | 70 | ○ | 5.8 | x | 0.6 | ○ | x |
| Comparative Example 4 | 15.5 | 254.0 | 81 | 39 | 11 | 0.043 | 65 | ○ | 12 | x | 0.8 | ○ | x |
| Comparative Example 5 | 31.0 | 76.2 | 92 | 39 | 4 | 0.052 | 66 | ○ | 8.5 | ○ | 0.2 | x | x |
| Example 2 | 31.0 | 101.6 | 89 | 39 | 6 | 0.059 | 72 | ○ | 6.9 | ○ | 0.52 | ○ | ○ |
| Example 3 | 31.0 | 127.0 | 86 | 39 | 7 | 0.055 | 65 | ○ | 7 | ○ | 0.6 | ○ | ○ |
| Comparative Example 6 | 31.0 | 127.0 | 86 | 39 | 1.5 | 0.012 | 90 | ○ | 55 | x | 0.6 | ○ | x |
| Comparative Example 7 | 31.0 | 127.0 | 86 | 39 | 13 | 0.102 | 30 | x | 7.5 | ○ | 0.6 | ○ | x |
| Comparative Example 8 | 31.0 | 127.0 | 86 | 30 | 7 | 0.055 | 65 | ○ | 30 | x | 0.6 | ○ | x |
| Comparative Example 9 | 31.0 | 127.0 | 86 | 48 | 7 | 0.055 | 63 | ○ | 7 | ○ | 0.3 | x | x |
| Comparative Example 10 | 31.0 | 177.8 | 81 | 39 | 8 | 0.045 | 70 | ○ | 11 | x | 0.8 | ○ | x |
| Example 4 | 46.5 | 76.2 | 90 | 39 | 4 | 0.052 | 72 | ○ | 7.8 | ○ | 0.52 | ○ | ○ |
| Example 5 | 46.5 | 101.6 | 87 | 39 | 6 | 0.059 | 73 | ○ | 8.2 | ○ | 0.52 | ○ | ○ |
| Example 6 | 46.5 | 152.4 | 80 | 39 | 8 | 0.052 | 75 | ○ | 8.5 | ○ | 0.85 | ○ | ○ |
| Example 7 | 46.5 | 127.0 | 83 | 39 | 8 | 0.063 | 78 | ○ | 8.5 | ○ | 0.8 | ○ | ○ |
| Comparative Example 11 | 69.8 | 101.6 | 85 | 39 | 6 | 0.059 | 68 | ○ | 20 | x | 0.6 | ○ | x |
| Comparative Example 12 | 69.8 | 101.6 | 85 | 39 | 6 | 0.059 | 68 | ○ | 22 | x | 0.6 | ○ | x |
| Comparative Example 13 | 62.0 | 63.5 | 90 | 39 | 1.6 | 0.025 | 98 | ○ | 100 | x | 0.52 | ○ | x |
| Comparative Example 14 | 62.0 | 63.5 | 90 | 39 | 2 | 0.031 | 98 | ○ | 50 | x | 0.52 | ○ | x |
| Example 8 | 62.0 | 63.5 | 90 | 39 | 2.8 | 0.044 | 96 | ○ | 9.5 | ○ | 0 | ○ | ○ |
| Example 9 | 62.0 | 63.5 | 90 | 39 | 3.41 | 0.054 | 62 | ○ | 9 | ○ | 0.52 | ○ | ○ |
| Comparative Example 15 | 62.0 | 63.5 | 90 | 39 | 4.2 | 0.066 | 20 | x | 8.3 | ○ | 0.52 | ○ | x |
| Comparative Example 16 | 62.0 | 63.5 | 90 | 39 | 5.8 | 0.091 | 10 | x | 8.2 | ○ | 0.52 | ○ | x |
| Comparative Example 17 | 62.0 | 63.5 | 90 | 39 | 7.8 | 0.123 | 3 | x | 8.2 | ○ | 0.52 | ○ | x |
| Comparative Example 18 | 62.0 | 63.5 | 90 | 39 | 8.5 | 0.134 | 3 | x | 8.2 | ○ | 0.52 | ○ | x |
| Comparative Example 19 | 62.0 | 63.5 | 90 | 39 | 9 | 0.142 | 3 | x | 8.2 | ○ | 0.52 | ○ | x |
| Comparative Example 20 | 62.0 | 63.5 | 90 | 39 | 10.8 | 0.170 | 2 | x | 8.2 | ○ | 0.52 | ○ | x |
| Comparative Example 21 | 62.0 | 63.5 | 90 | 39 | 11 | 0.173 | 3 | x | 8.1 | ○ | 0.52 | ○ | x |
| Comparative Example 22 | 62.0 | 78.7 | 88 | 39 | 1.6 | 0.020 | 98 | ○ | — | x | 0.65 | ○ | x |
| Comparative Example 23 | 62.0 | 78.7 | 88 | 39 | 2 | 0.025 | 98 | ○ | — | x | 0.65 | ○ | x |
| Comparative Example 24 | 62.0 | 78.7 | 88 | 39 | 2.8 | 0.036 | 96 | ○ | 55 | x | 0.65 | ○ | x |
| Example 10 | 62.0 | 78.7 | 88 | 39 | 3.4 | 0.043 | 80 | ○ | 9.5 | ○ | 0.65 | ○ | ○ |
| Example 11 | 62.0 | 78.7 | 88 | 39 | 4.2 | 0.053 | 65 | ○ | 8.5 | ○ | 0.65 | ○ | ○ |
| Comparative Example 25 | 62.0 | 78.7 | 88 | 39 | 5.8 | 0.074 | 15 | x | 8.2 | ○ | 0.65 | ○ | x |
| Comparative Example 26 | 62.0 | 78.7 | 88 | 39 | 7.8 | 0.099 | 10 | x | 8.2 | ○ | 0.65 | ○ | x |
| Comparative Example 27 | 62.0 | 78:7 | 88 | 39 | 8.5 | 0.108 | 8 | x | 8.2 | ○ | 0.65 | ○ | x |
| Comparative Example 28 | 62.0 | 78.7 | 88 | 39 | 9 | 0.114 | 5 | x | 8.2 | ○ | 0.65 | ○ | x |
| Comparative Example 29 | 62.0 | 78.7 | 88 | 39 | 10.8 | 0.137 | 5 | x | 8.2 | ○ | 0.65 | ○ | x |
| Comparative Example 30 | 62.0 | 78.7 | 88 | 39 | 11 | 0.140 | 5 | x | 8.2 | ○ | 0.65 | ○ | x |
| Comparative Example 31 | 62.0 | 109.2 | 84 | 39 | 1.6 | 0.015 | 99 | ○ | — | x | 0.8 | ○ | x |
| Comparative Example 32 | 62.0 | 109.2 | 84 | 39 | 2 | 0.018 | 99 | ○ | — | x | 0.8 | ○ | x |
| Comparative Example 33 | 62.0 | 109.2 | 84 | 39 | 2.8 | 0.026 | 98.5 | ○ | — | x | 0.8 | ○ | x |
| Comparative Example 34 | 62.0 | 109.2 | 84 | 39 | 3.4 | 0.031 | 98.2 | ○ | 96 | x | 0.8 | ○ | x |
| Comparative Example 35 | 62.0 | 109.2 | 84 | 39 | 4.2 | 0.038 | 95 | ○ | 55 | x | 0.8 | ○ | x |

TABLE 2

| | Cell Density (cells/cm²) | Rib thickness (μm) | OFA (%) | Porosity (%) | Average pore diameter (μm) | d/t | Efficiency of PM capture (%) | | Pressure loss (kPa) | | Strength (MPa) | | Overall rating |
|---|---|---|---|---|---|---|---|---|---|---|---|---|---|
| Example 12 | 62.0 | 109.2 | 84 | 39 | 5.8 | 0.053 | 70 | ○ | 9.5 | ○ | 0.8 | ○ | ○ |
| Comparative Example 36 | 62.0 | 109.2 | 84 | 39 | 7.8 | 0.071 | 15 | x | 8.3 | ○ | 0.8 | ○ | x |
| Comparative Example 37 | 62.0 | 109.2 | 84 | 39 | 8.5 | 0.078 | 13 | x | 8.3 | ○ | 0.8 | ○ | x |
| Comparative Example 38 | 62.0 | 109.2 | 84 | 39 | 9 | 0.082 | 13 | x | 8.3 | ○ | 0.8 | ○ | x |
| Comparative Example 39 | 62.0 | 109.2 | 84 | 39 | 10.8 | 0.099 | 13 | x | 8.3 | ○ | 0.8 | ○ | x |
| Comparative Example 40 | 62.0 | 109.2 | 84 | 39 | 11 | 0.101 | 10 | x | 8.3 | ○ | 0.8 | ○ | x |
| Comparative Example 41 | 62.0 | 132.1 | 80 | 39 | 1.6 | 0.012 | 99.5 | ○ | — | x | 1.1 | ○ | x |
| Comparative Example 42 | 62.0 | 132.1 | 80 | 39 | 2 | 0.015 | 99.5 | ○ | — | x | 1.1 | ○ | x |
| Comparative Example 43 | 62.0 | 132.1 | 80 | 39 | 2.8 | 0.021 | 98 | ○ | — | x | 1.1 | ○ | x |
| Comparative Example 44 | 62.0 | 132.1 | 80 | 39 | 3.4 | 0.026 | 98 | ○ | 50 | x | 1.1 | ○ | x |

TABLE 2-continued

|  | Cell Density (cells/cm²) | Rib thickness (μm) | OFA (%) | Porosity (%) | Average pore diameter (μm) | d/t | Efficiency of PM capture (%) | | Pressure loss (kPa) | | Strength (MPa) | | Overall rating |
|---|---|---|---|---|---|---|---|---|---|---|---|---|---|
| Comparative Example 45 | 62.0 | 132.1 | 80 | 39 | 4.2 | 0.032 | 96 | ○ | 20 | x | 1.1 | ○ | x |
| Example 13 | 62.0 | 132.1 | 80 | 39 | 5.8 | 0.044 | 90 | ○ | 9.5 | ○ | 1.1 | ○ | ○ |
| Example 14 | 62.0 | 132.1 | 80 | 39 | 7.8 | 0.059 | 85 | ○ | 9 | ○ | 1.1 | ○ | ○ |
| Example 15 | 62.0 | 132.1 | 80 | 39 | 8.5 | 0.064 | 70 | ○ | 8.3 | ○ | 1.1 | ○ | ○ |
| Comparative Example 46 | 62.0 | 132.1 | 80 | 39 | 9 | 0.068 | 20 | x | 8.3 | ○ | 1.1 | ○ | x |
| Comparative Example 47 | 62.0 | 132.1 | 80 | 39 | 10.8 | 0.082 | 20 | x | 8.3 | ○ | 1.1 | ○ | x |
| Comparative Example 48 | 62.0 | 132.1 | 80 | 39 | 11 | 0.083 | 20 | x | 8.3 | ○ | 1.1 | ○ | x |
| Comparative Example 49 | 62.0 | 160.0 | 76 | 39 | 1.6 | 0.010 | 99.5 | ○ | — | x | 3.5 | ○ | x |
| Comparative Example 50 | 62.0 | 160.0 | 76 | 39 | 2 | 0.012 | 99.5 | ○ | — | x | 3.5 | ○ | x |
| Comparative Example 51 | 62.0 | 160.0 | 76 | 39 | 2.8 | 0.017 | 99.5 | ○ | — | x | 3.5 | ○ | x |
| Comparative Example 52 | 62.0 | 160.0 | 76 | 39 | 3.4 | 0.021 | 98.5 | ○ | — | x | 3.5 | ○ | x |
| Comparative Example 53 | 62.0 | 160.0 | 76 | 39 | 4.2 | 0.026 | 96 | ○ | 70 | x | 3.5 | ○ | x |
| Comparative Example 54 | 62.0 | 160.0 | 76 | 39 | 5.8 | 0.036 | 96 | ○ | 25 | x | 3.5 | ○ | x |
| Example 16 | 62.0 | 160.0 | 76 | 39 | 7.8 | 0.049 | 95 | ○ | 9.3 | ○ | 3.5 | ○ | ○ |
| Example 17 | 62.0 | 160.0 | 76 | 39 | 8.5 | 0.053 | 80 | ○ | 8.5 | ○ | 3.5 | ○ | ○ |
| Example 18 | 62.0 | 160.0 | 76 | 39 | 9 | 0.056 | 65 | ○ | 8.3 | ○ | 3.5 | ○ | ○ |
| Comparative Example 55 | 62.0 | 160.0 | 76 | 39 | 10.8 | 0.067 | 25 | x | 8.3 | ○ | 3.5 | ○ | x |
| Comparative Example 56 | 62.0 | 160.0 | 76 | 39 | 11 | 0.069 | 20 | x | 8.3 | ○ | 3.5 | ○ | x |
| Example 19 | 31.0 | 101.6 | 89 | 35 | 6 | 0.059 | 72 | ○ | 7.2 | ○ | 0.5 | ○ | ○ |
| Example 20 | 31.0 | 101.6 | 89 | 45 | 6 | 0.059 | 72 | ○ | 6.8 | ○ | 0.5 | ○ | ○ |

Examples 2 to 20, Comparative Examples 1 to 56

Honeycomb structures were produced (Examples 2 to 20, Comparative Examples 1 to 56) in the same manner as in Example 1 except that the particle diameter and use amount of pore former were adjusted so as to give the average pore diameter and porosity of partition wall, shown in Table 1 and Table 2 and that the cell density, rib thickness, OFA and "d/t" of honeycomb structure were made the levels shown in Table 1 and Table 2. Similarly to the case of Example 1, each honeycomb structure was evaluated for "efficiency of PM capture", "pressure loss" and "strength of honeycomb structure", according to the above-mentioned methods. The results are shown in Table 1 and Table 2. Incidentally, in Table 1 and Table 2, "–" in the column of "pressure loss" indicates that measurement was impossible because of too large a pressure loss (measurement limit: 100 kPa).

Figure 3:
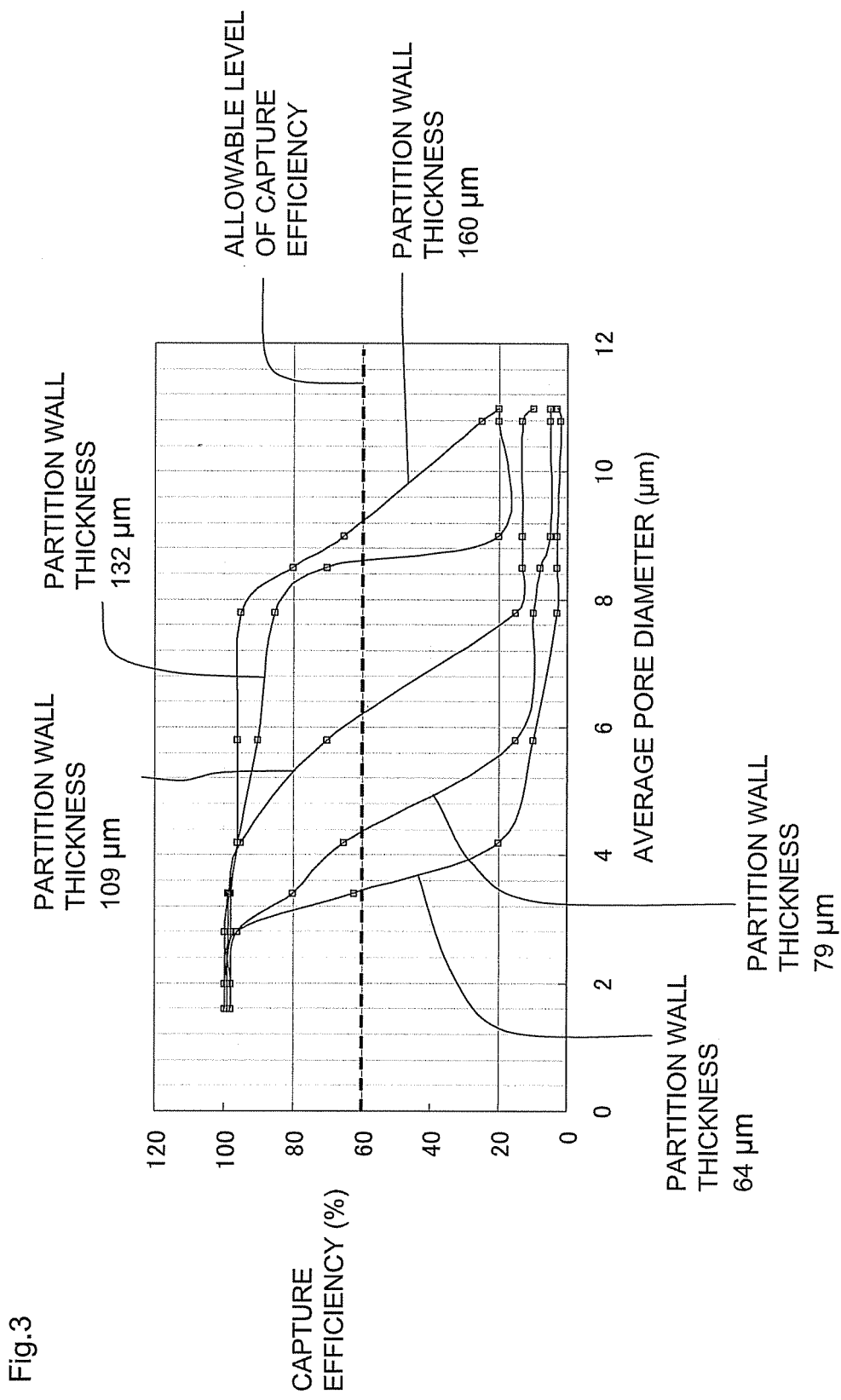
FIG. 3 is a graph showing a relationship between the "average pore diameter" and "capture efficiency", of honeycomb structure.
Figure 4:
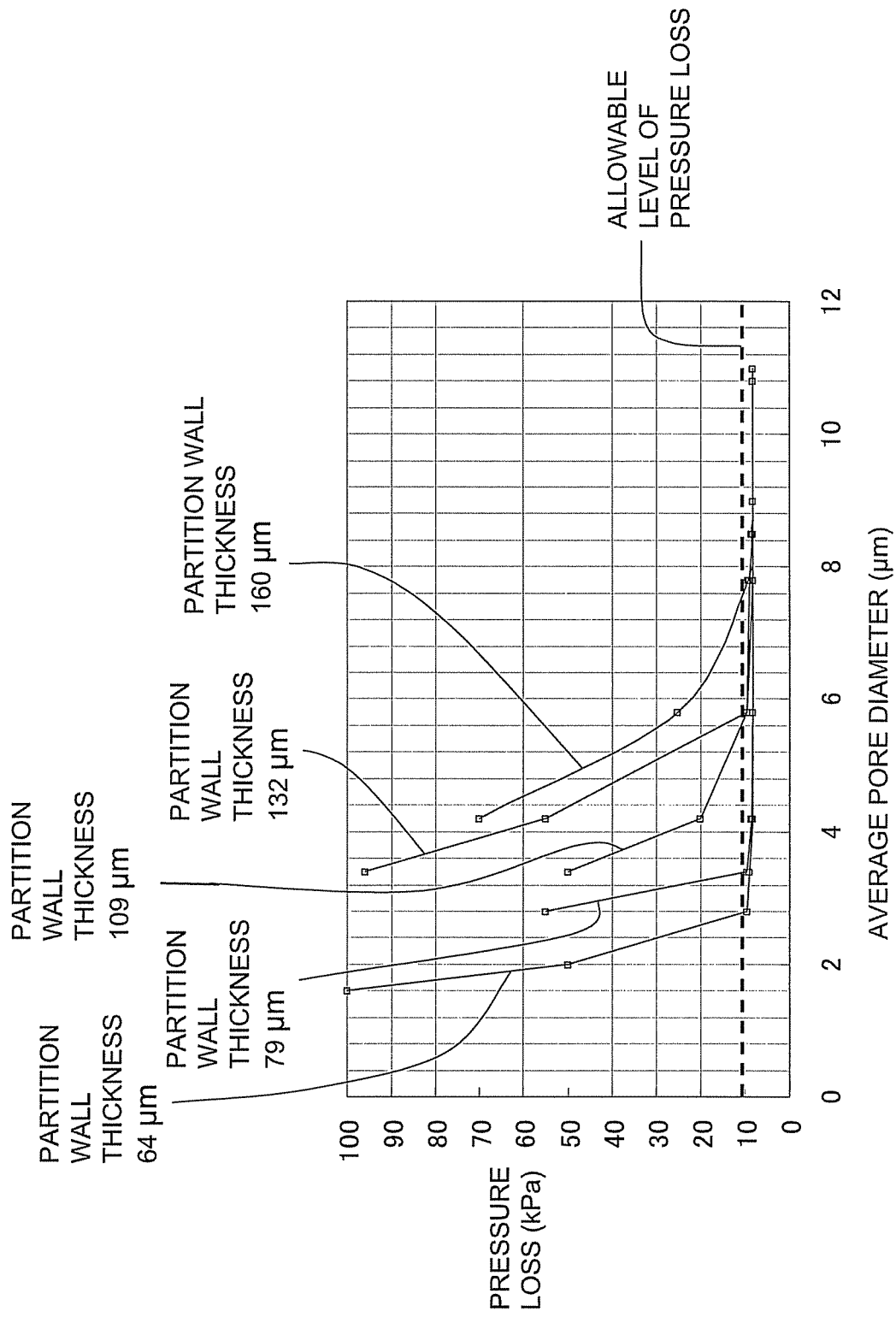
FIG. 4 is a graph showing a relationship between the "average pore diameter" and "pressure loss", of honeycomb structure.

Based on the above evaluation results, a relationship between "average pore diameter" and "efficiency of PM capture" was shown in FIG. 3, and a relationship between "average pore diameter" and "pressure loss" was shown in FIG. 4. FIG. 3 is a graph showing a relationship between "average pore diameter" and "efficiency of PM capture". FIG. 4 is a graph showing a relationship between "average pore diameter" and "pressure loss". In FIG. 3, "allowable level of capture efficiency" means a pass level of capture efficiency, and a capture efficiency of "allowable level" or higher indicates that the capture efficiency is pass. In FIG. 4, "allowable level of pressure loss" means a pass level of pressure loss, and a pressure loss of "allowable level" or lower indicates that the pressure loss is pass.

As is clear from FIG. 3, the capture efficiency of honeycomb structure changes rapidly in a particular range of average pore diameter, in each case of partition wall thickness, and is extremely low when the average pore diameter is larger than that particular range. It is also clear that, in a honeycomb structure of smaller partition wall thickness, the rapid change of capture efficiency takes place in a smaller average pore diameter and the average pore diameter for achieving a capture efficiency of 60% or higher is smaller.

This is considered to be because pores of vary large diameters relative to the average pore diameter (i.e. through-holes of columnar shape) are present in the distribution of pores. That is, it is considered to be because the presence of columnar through-holes in a certain amount or more gives rise to the sharp reduction in capture efficiency. It is considered to be because a smaller partition wall thickness easily forms such columnar through-holes and, in order to make difficult the formation of the columnar through-holes, a smaller average pore diameter becomes necessary. Here, "columnar through-hole" means such a shape that the vacant portion of through-hole is columnar and a gas can pass in a nearly straight line from one side (surface) of partition wall to other side (back surface) (the through-hole need not be at right angles to the surface and back surface of partition wall).

As is clear from the above measurement results, a honeycomb structure has a high capture efficiency when it has a relationship between average pore diameter d and partition wall thickness t, of "d <0.065t".

As is clear from FIG. 4, the pressure loss of honeycomb structure rapidly increases when its average pore diameter becomes smaller than a particular level, in each case of partition wall thickness. It is also clear that, in a honeycomb structure of smaller partition wall thickness, the rapid increase in pressure loss occurs at a smaller average pore diameter and the average pore diameter for achieving a pressure loss of 10% or smaller is smaller.

This is considered to be because a larger partition wall thickness or a smaller average particle diameter results in lower continuity of pores. That is, it is considered to be because a lower continuity of pores results in a larger resistance for gas passage through partition wall pores and, when the continuity of pores becomes lower than a certain level, rapid increase in pressure loss appears. Here, "continuity of pores" means an extent in which a pore communicates with other pore"; and "high continuity of pores" means that the volume ratio of closed pores not communicating with other pores (closed pores) is low, and "low continuity of pores" means that the volume ratio of closed pores (closed pores) not communicating with other pores is high.

As is clear from the above evaluation results, a honeycomb structure has a high capture efficiency when it has a relationship between average pore diameter d and partition wall thickness t, of "d>0.040t".

INDUSTRIAL APPLICABILITY

The honeycomb structure of the present invention can be preferably used for treatment of the particulate matter contained in the exhaust gas emitted from a direct fuel injection type gasoline engine.

EXPLANATION OF NUMERICAL SYMBOLS

1: a partition wall; 2: a cell; 3: a plugging portion; 4: an outer wall; 5: an inlet side end face; 6: an outlet side end face; 11: a honeycomb structure body; 100: a honeycomb structure

The invention claimed is:

1. A gasoline engine filter having a honeycomb structure comprising:
   a honeycomb structure body having porous partition walls forming a plurality of divided cells that each function as a fluid passage, an outer wall present at an outermost circumference of the honeycomb structure body, and plugging portions provided at open ends of given cells at a fluid inlet-side end face of the honeycomb structure body, as well as at open ends of residual cells at a fluid outlet-side end face of the honeycomb structure body;
   wherein a thickness of each partition wall is 50.8 μm inclusive to 161.5 μm exclusive;
   wherein a cell density is 15.5 to 62.0 cells/cm$^2$;
   wherein a cell opening ratio of the honeycomb structure body is 76 to 91%;
   wherein a porosity of the partition walls is 35 to 45%;
   wherein an average pore diameter of the partition walls is 2 μm inclusive to 10 μm exclusive;
   wherein a material of the partition walls includes at least one member selected from the group consisting of cordierite, aluminum titanate, silicon carbide, alumina and mullite; and
   wherein a value obtained by dividing the average pore diameter of the partition walls by the thickness of the partition walls is larger than 0.043 but smaller than 0.064.

* * * * *